(12) United States Patent
Harty et al.

(10) Patent No.: US 8,463,825 B1
(45) Date of Patent: Jun. 11, 2013

(54) HYBRID FILE SYSTEM FOR VIRTUAL MACHINE STORAGE

(75) Inventors: Kieran J. Harty, San Francisco, CA (US); Mark G. Gritter, Eagan, MN (US); Raj A. Sudarsanam, Fremont, CA (US); Zubin D. Dittia, San Mateo, CA (US); Brandon W. Salmon, East Palo Alto, CA (US); Vyacheslav V. Malyugin, Los Gatos, CA (US)

(73) Assignee: Tintri Inc., Mountain View, CA (US)

( * ) Notice: Subject to any disclaimer, the term of this patent is extended or adjusted under 35 U.S.C. 154(b) by 79 days.

(21) Appl. No.: 13/094,682

(22) Filed: Apr. 26, 2011

Related U.S. Application Data

(60) Provisional application No. 61/343,384, filed on Apr. 27, 2010.

(51) Int. Cl.
*G06F 17/30* (2006.01)
*G06F 13/00* (2006.01)

(52) U.S. Cl.
USPC .......................................... 707/813; 711/100

(58) Field of Classification Search
USPC .................... 707/813, 823, 821, 822; 711/100
See application file for complete search history.

(56) References Cited

U.S. PATENT DOCUMENTS 6,021,408 A * 2/2000 Ledain et al. ................. 707/823
7,917,695 B2 * 3/2011 Ulrich et al. .................. 711/114

* cited by examiner

*Primary Examiner* — Hung T Vy
(74) *Attorney, Agent, or Firm* — Van Pelt, Yi & James LLP

(57) ABSTRACT

A data storage system is disclosed, including: a first storage device of a first storage device type, a second storage device of a second storage device type, and a processor configured to implement a hybrid file system configured to store each of a plurality of data values in at least a corresponding primary location, which for a given data value may be in either the first storage device or the second storage device; wherein the hybrid file system is configured to use a first access approach optimized based on a first access attribute of the first storage device type to interact with the first storage device and a second access approach optimized based on a second access attribute of the second storage device type to interact with the second storage device. Reading data is disclosed, including: determining that a storage location on a first tier storage from which a requested data was written back to a second tier storage has not been reclaimed by a garbage collection associated with the first tier storage, and retrieving the data from the storage location on the first tier storage.

13 Claims, 15 Drawing Sheets

HYBRID FILE SYSTEM FOR VIRTUAL MACHINE STORAGE

CROSS REFERENCE TO OTHER APPLICATIONS

This application claims priority to U.S. Provisional Patent Application No. 61/343,384 entitled HYBRID FLASH-DISK FILE SYSTEM FOR VIRTUAL MACHINE STORAGE filed Apr. 27, 2010 which is incorporated herein by reference for all purposes.

BACKGROUND OF THE INVENTION

In virtual machine environments, the file system workload typically involves a relatively small number of large files (e.g., virtual disk files), to which reads and writes are the primary operations. In many cases, only a relatively small part of the data comprising a virtual disk is being written to and/or read at any one time.

In tiered storage systems, i.e., those that include two or more different types of storage device and/or media, decisions to switch between different tiers of storage typically have been made based on the different speeds of accessing data for each of the tiers of the storage. For example, in typical multi-tiered storages involving flash and hard disk storages, the flash storage may used for caching purposes, due to its relatively fast access times, while the disk storage is used for more long-term storage. In a typical tiered storage system, storage parameters such as block size are determined to optimize performance and/or accommodate a limitation of one or the other of the types of storage, and the same parameter is used for both types of storage.

BRIEF DESCRIPTION OF THE DRAWINGS

Various embodiments of the invention are disclosed in the following detailed description and the accompanying drawings.

DETAILED DESCRIPTION

Figure 1:
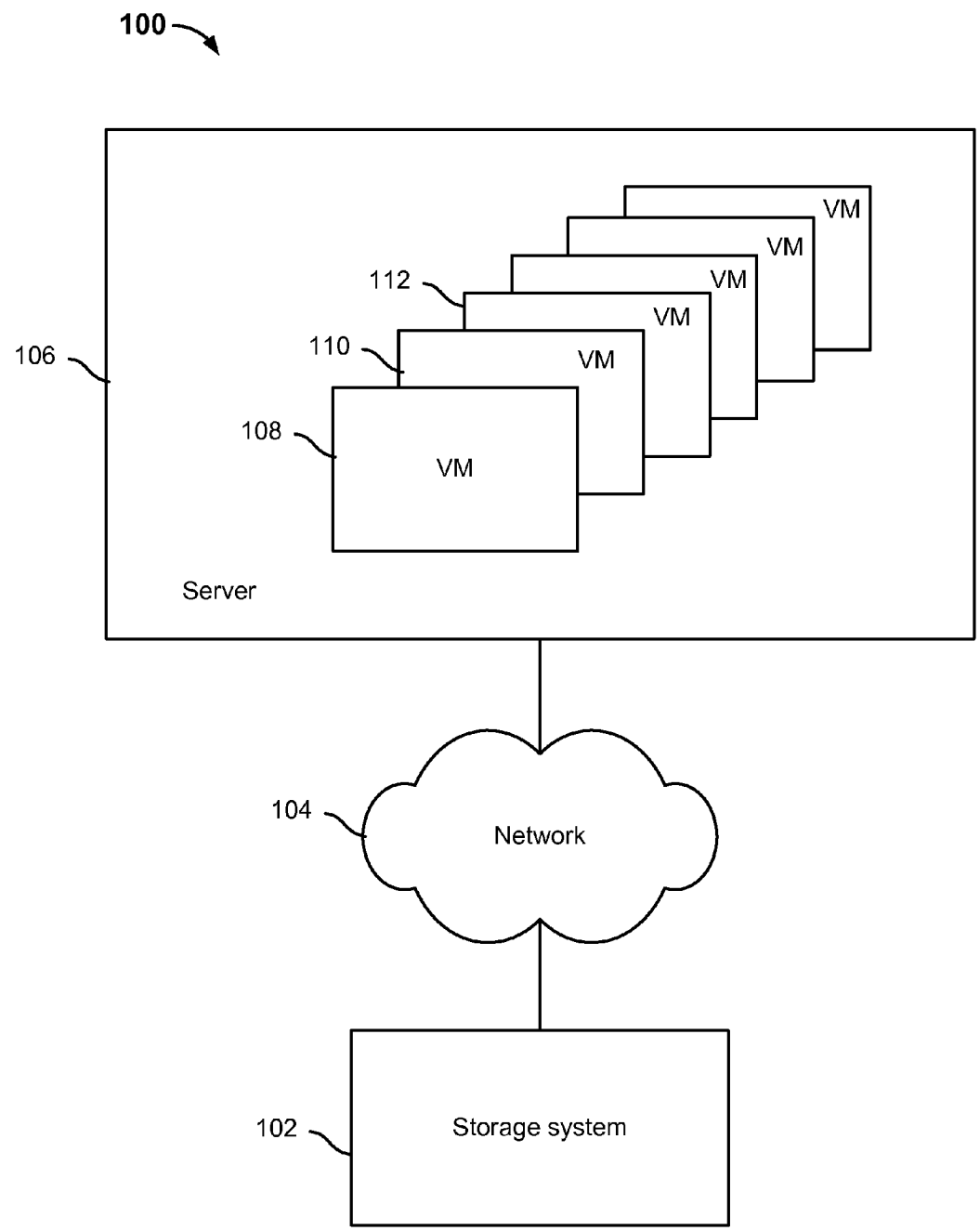
FIG. 1 is a diagram showing an embodiment of a file system for the storage of VMs.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A data storage system using a hybrid file system optimized in some embodiments for virtual machine storage is disclosed. In various embodiments, the data storage system includes a first storage device of a first storage device type and a second storage device of a second storage device type. In various embodiments, the storage system is managed by a hybrid file system that is configured to store data in a corresponding primary location that could be in either the first storage device or the second storage device. In some embodiments, the hybrid file system is configured to use a first access approach optimized based on a first access attribute for the first storage device type to interact with the first storage device. For example, for a first storage device of the Solid State Drive (e.g., flash) type, the hybrid file system uses a log-structured approach to read/write data to the first storage device. An advantage of the log-structured file system is that it permits data to be written (e.g., to flash) in large, sequential units. Another advantage of the log-structure file system is that for writes, it permits for data to be stored in new locations in flash, rather than writing over locations to which were previously written. In some embodiments, the hybrid file system uses a second access approach optimized based on a second access attribute of the second storage device type to interact with the second storage device. For example, for a second storage device of the Hard Disk Drive type, the hybrid file system manages data using relatively large blocks and in some embodiments stores data written back from the first storage device.

In various embodiments, data (e.g., one or more data objects) is written to a first tier storage (e.g., a first storage device of a first storage device type) in units that are optimized for the first tier storage, for example a Solid State Drive storage (e.g., flash storage). Data written to the first tier storage is written back to a second tier storage (e.g., a second storage device of a second storage device type) in units that are optimized for the second tier storage, for example a Hard Disk Drive storage (e.g., disk storage). In various embodiments, a unit that is optimized for the second tier storage is larger than the unit that is optimized for the first tier storage. In some embodiments, the first tier storage also serves as a cache for data that has been written back to the second tier storage but has not yet been reclaimed. Data is reclaimed in the first tier storage by a process of garbage collection that operates based at least in part on the frequency that the data is accessed (e.g., written to and/or read). The first tier storage includes metadata that maps to locations (e.g., in the first tier storage and/or second tier storage) of data. In some embodiments, this metadata also includes other information (e.g., access counts, identifiers of one or more associated virtual machines, identifiers of one or more associated virtual machine files) regarding the data.

In various embodiments, policies (e.g., storage quotas) may be set for a group (e.g., eviction and/or write back) of one or more virtual machines (VMs), one or more virtual disks (vdisks), or one or more files. Different groups, VMs, vdisks, etc. may have different policies. In some embodiments, these policies are enforced by group modules, which interface with other operations, such as the garbage collection.

FIG. 1 is a diagram showing an embodiment of a file system for the storage of VMs. In the example shown, system 100 includes server 106, network 104, and storage system 102. In various embodiments, network 104 includes various high speed data networks and/or telecommunications networks. In some embodiments, storage system 102 communicates with server 106 via network 104. In some embodiments, the file system for the storage of VMs does not include network 104 and storage system 102 is a component of server 106. In some embodiments, server 106 is configured to communicate with more storage systems in addition to storage system 102.

In various embodiments, server 106 runs several VMs. In the example shown, VMs 108, 110, and 112 (and other VMs) are running on server 106. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes vdisks and other data related to the specific VM (e.g., configuration files and utility files for implementing functionality, such as snapshots, that are supported by the VM management infrastructure). A vdisk appears to be an ordinary physical disk drive to the guest operating system running on a VM. In various embodiments, one or more files may be used to the store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of the one or more vdisks, the state of the VM's BIOS, information and metadata about snapshots by the hypervisor, configuration information of the specific VM, etc. In various embodiments, data associated with a particular VM is stored at a storage system as one or more files. In various embodiments, the files are examples of virtual machine storage abstractions. In some embodiments, the respective files associated with (at least) VMs 108, 110, and 112 running on server 106 are stored at storage system 102.

In some embodiments, a hypervisor (not shown) manages the VMs running on server 106. In some embodiments, the hypervisor is located at server 106. In some embodiments, the hypervisor is located on another server that is in communication with server 106.

In some embodiments, storage system 102 is configured to store meta information identifying which stored data objects, such as files or other virtual machine storage abstractions, are associated with which VM or vdisk. In various embodiments, storage system 102 stores the data of VMs running on server 106 and also stores the information that provides mapping or other identification of which data objects are associated with which specific VMs. In various embodiments, mapping or identification of specific VMs includes mapping to the files on the storage that are associated with each specific VM. In various embodiments, storage system 102 also stores at least a portion of the files associated with the specific VMs in addition to the mappings to those files. In various embodiments, storage system 106 refers to one or more physical systems and/or associated hardware and/or software components configured to work together to store and manage stored data, such as files or other stored data objects. In some embodiments, a hardware component that is used to (at least in part) implement the storage system may comprise of multiple tiers of storage. In some embodiments, the storage system may be implemented with a hybrid system with a combination of flash and disk storage.

In some embodiments, the information that provides mapping or identification is referred to as meta information. Meta information includes attributes and any policies associated with a specific VM. Examples of attributes include a unique identifier of the VM (e.g., a universal unique identifier or UUID), the files or vdisks that comprise the VM, the storage location of each file or vdisk associated with the VM, the type of guest operating system that is being run by the VM, whether the VM is currently active or not, etc. Examples of policies, such as those that relate to storage management, include quality of service (i.e., the difference in prioritization that is given to different applications), performance guarantees, resources quotas, replication and migration policies for the storage corresponding to the specific VM. In some embodiments, some meta information is provided by the administrator (e.g., through the administrator interface) and some are collected and/or updated from the hypervisor or other management entity (e.g., via queries). In some embodiments, all the meta information associated with a specific VM is stored as a set of meta information and identified by the unique identifier of the specific VM (e.g., the set of meta information includes an attribute that is a unique identifier of the specific VM). In some embodiments, meta information for VMs may be stored in data objects instantiated via object-oriented programming, where the set of meta information for a specific VM is a stored as a data object (e.g., the meta information is stored as attributes of the data object). In some embodiments, the meta information is not directly accessible by the administrator. One benefit to storing meta information that maps to specific VMs and their associated files is that storage management may be performed at one or more granularities of VMs, vdisks or the VMs, files or sets of files, which are denoted by the stored meta information.

Figure 2:
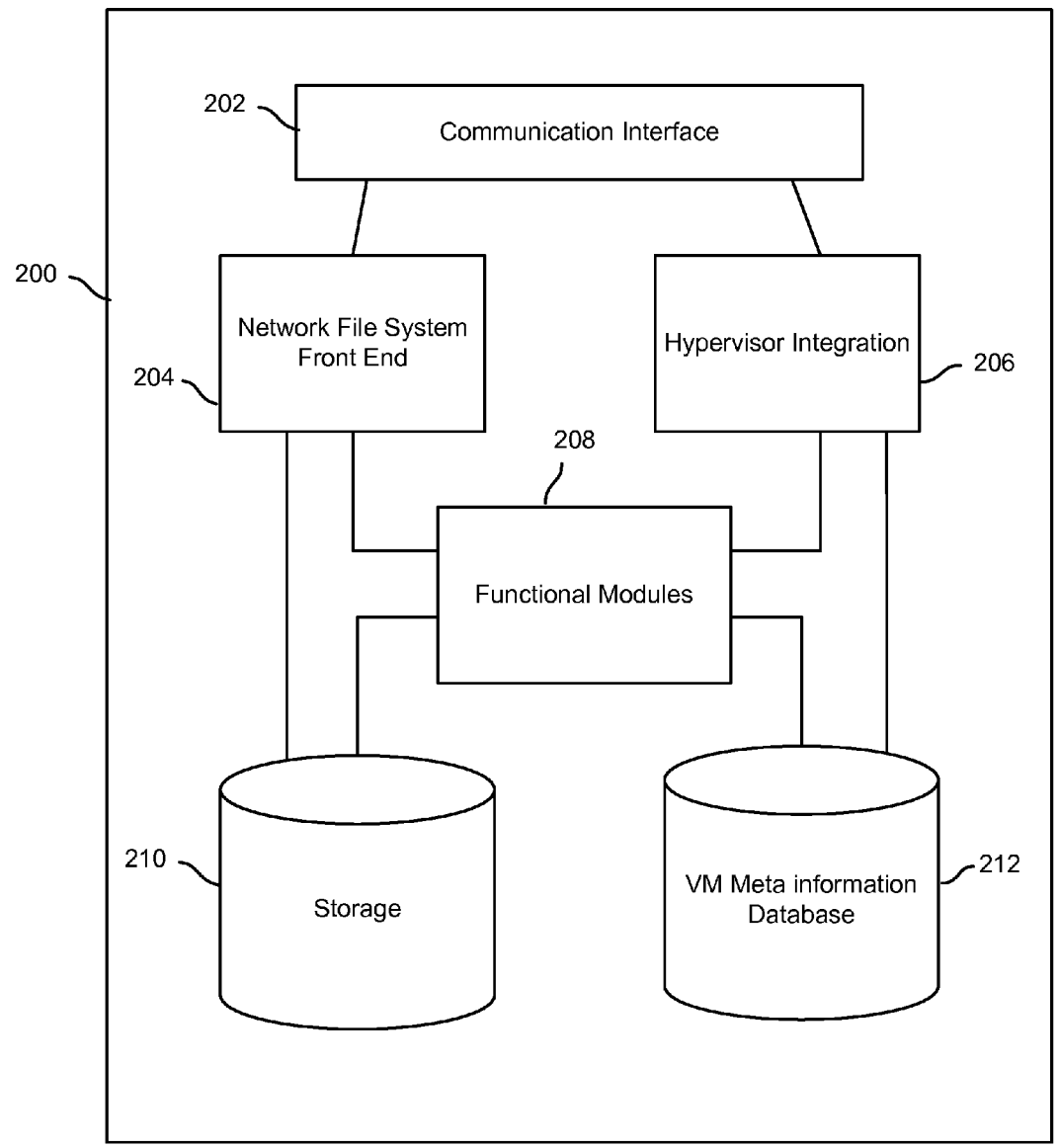
FIG. 2 is a diagram showing an embodiment of a storage system of virtual machines using a hybrid file system.

FIG. 2 is a diagram showing an embodiment of a storage system of virtual machines using a hybrid file system. In some embodiments, storage system 102 may be implemented by system 200. In the example shown, system 200 includes communication interface 202, network files system front end 204, hypervisor integration 206, functional modules 208, storage 210, and VM meta information database 212. System 200 may be connected to a network (not shown) to communicate with the host server running one or more VMs. Storage 210 stores the data (e.g., the files) of the one or more VMs. Storage 210 also stores the meta information associated with the one or more VMs. Storage 210 communicates with the host server via communication interface 202 (e.g., a network interface card) and network file system front end 204 via a network protocol. In some embodiments, storage 210 is configured to learn of data transferring to or from the storage via network protocols calls that it receives from the host server. If the transfer of data affects the VMs for which storage 210 stores data and meta information, then the meta information is updated accordingly. A hypervisor (not shown) creates and deletes VMs at the host server and also manages resources among the VMs. Storage 210 is configured to communicate (e.g., over the network and communication interface 202) to the hypervisor through hypervisor integration 206. In some embodiments, hypervisor integration 206 is used to communicate with the hypervisor in order to collect and/or update the meta information stored at storage 210. In some embodiments, VM meta information database 212 also stores at least some of the meta information associated with the VMs running at the server. In some embodiments, storage 210 and VM meta information database 212 store some of the same meta information. In some embodiments, the meta information database 212 is not used in system 200. Functional modules 208 may include statistics collector, snapshotting, resource management, and administrator interface. In some embodiments, the functional modules are configured to communicate with one or more of network file system front end 204, hypervisor integration 206, storage 210 and VM meta information database 212.

In some embodiments, system 200 is configured to receive a request at the administrator interface functional module for a storage management operation with respect to a specific VM for which system 200 stores meta information. Either or both of storage 210 and VM meta information database 212 may be used to identify the relevant underlying files of the specific VM based on the stored meta information for the specific VM. Subsequently, the operation is performed on identified files of the specific VM. Examples of a storage management operation include read and writes (e.g., to a specific file associated with a VM).

Figure 3:
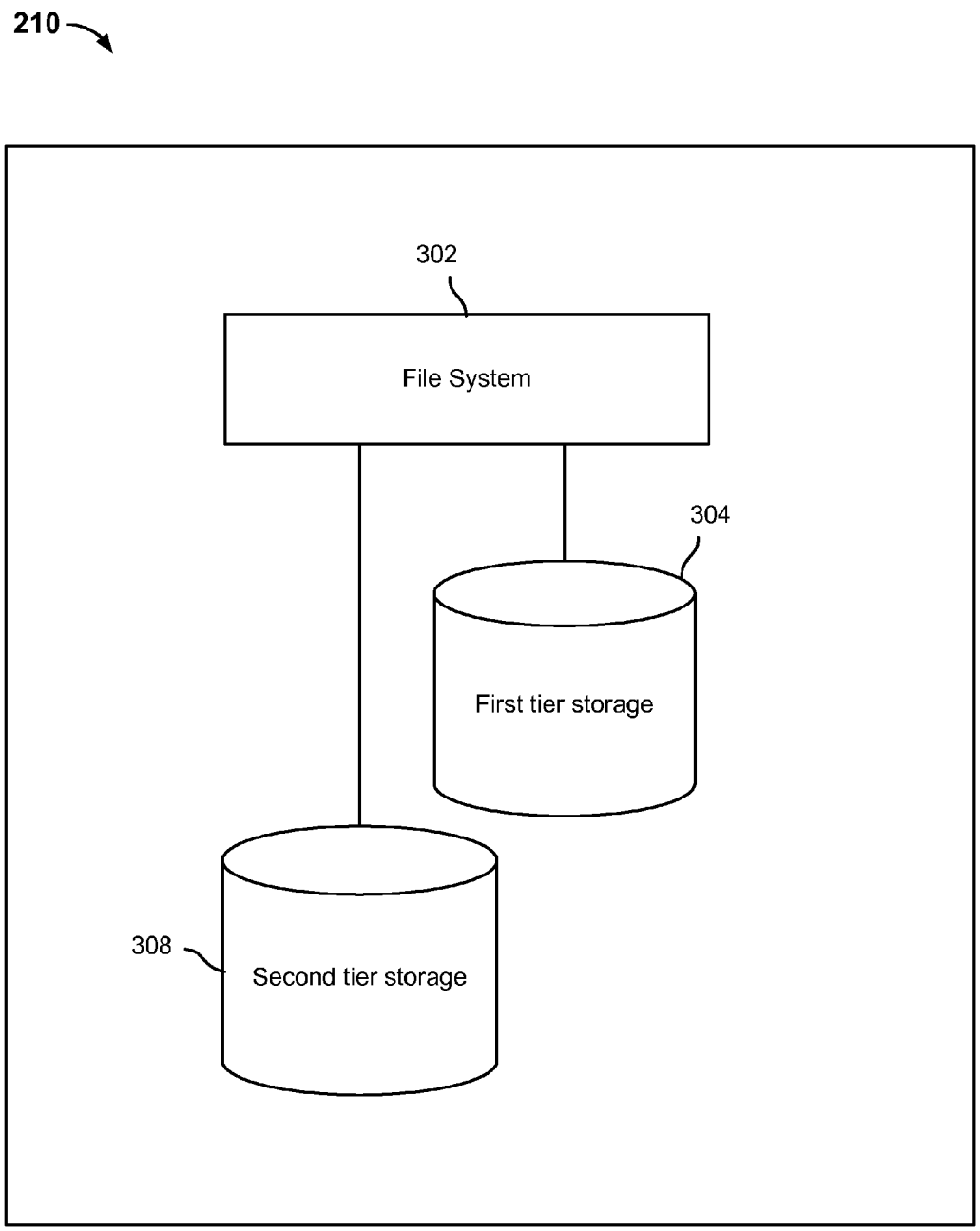
FIG. 3 is a diagram of an embodiment of a storage with a hybrid file system.

FIG. 3 is a diagram of an embodiment of a storage with a hybrid file system. In some embodiments, FIG. 3 is an example of storage 210 of FIG. 2. Storage 210 includes file system 302, first tier storage 304, and second tier storage 308. In some embodiments, first tier storage 304 is flash storage. Flash storage may include one or more flash disks. In some embodiments, second tier storage 308 is disk storage. Disk storage may include one or more physical disks. In some embodiments, metadata is stored in first tier storage 304. In some embodiments, metadata is stored in a separate storage device that is accessible by first tier storage 304 and second tier storage 308. In some embodiments, some metadata can also reside on second tier storage 308. For example, metadata that is not in very active use, such as metadata associated with a snapshot of a vdisk, is stored on the disk storage so that flash storage can be prioritized for metadata that is in more active use.

In some embodiments, file system 302 communicates to one or more of the following: a server (e.g., over a network), an administrator interface, a hypervisor, and functional modules (not shown). In some embodiments, first tier storage 304 and second tier storage 308 store the files of the VMs that are associated with and managed by the storage system (e.g., storage system 200 of FIG. 2) of which storage 210 is a component. In some embodiments, first tier storage 304 stores the meta information (e.g., attributes and policies) associated with each of the VMs whose files are stored by first tier storage 304 and second tier storage 308. In some embodiments, such meta information is stored with file system 302 or at first tier storage 304. In some embodiments, metadata is stored at first tier storage 304. Such metadata includes mappings to each file (e.g., the locations of where data associated with the file are stored on first tier storage 304 and second tier storage 308) stored by storage 210. Such metadata data structures may be represented by tree structures (e.g., B-trees).

In some embodiments, file system 302 is configured to receive a request to perform a storage management operation with respect to a specific VM that is associated with storage 210. Using the meta information that is associated with the specific VM, the specific files of first tier storage 304 and/or second tier storage 308 that are associated with the specific VM can be identified so that the requested operation can be performed with respect to the relevant files of the specific VM.

In some embodiments, first tier storage 304 stores VM files of file system 302 as a collection of blocks (e.g., flash blocks) of a first size (e.g., 4 KB) that is optimized for storage at first tier storage 304. In some embodiments, second tier storage 308 stores VM files as a collection of blocks (e.g., disk extents) of a second size (e.g., 512 KB to 2 MB) that is optimized for storage at second tier storage 308. In various embodiments, the block size used for first tier storage is smaller than the block size used for second tier storage. In some embodiments, first tier storage 304 has comparatively higher I/O capacity than second tier storage 308. In various embodiments, first tier storage 304 serves as a cache for data that also resides on second tier storage 308 and as a persistent storage for high-priority data.

Data of the first size from first tier storage 304 is aggregated into the units of data of the second size for second tier storage 308. When certain criteria have been met, the aggregated data is written to and stored on second tier storage 308 (e.g., in a "write back operation"). For example, flash blocks are aggregated within the enclosures of one or more disk extents and when certain criteria have been met, one or more entire disk extents are written back from the flash storage to the disk storage. In some embodiments, data from first tier storage 304 that has been written back to second tier storage 308 remain available at first tier storage 304 (e.g., first tier storage acts as a cache for the data) until it is reclaimed (e.g., by a garbage collection operation of first tier storage 304). Metadata (e.g., tree data structures) stored at first tier storage 304 includes information that denote, for example, where data of a certain file is stored (e.g., on first tier storage 304 and/or second tier storage 308) and whether a copy of data that is stored at second tier storage 308 is still available (e.g., not reclaimed) on first tier storage 304. In some embodiments, the metadata is updated when file system 302 performs a storage-related operation (e.g., a read or write).

For example, file system 302 receives a request to perform a write operation. The request includes information that identifies a specific file associated with a certain VM. File system 302 is configured to take the data to be written and break it into blocks of the first size (e.g., flash blocks) for storage on first tier storage 304 (e.g., flash) and adds it to a metadata tree (e.g. associated with the specific file) as "dirty" data. As used herein, data that is stored on first tier storage 304 (e.g., flash) but not on second tier storage 308 (e.g., disk) in blocks of the second size (e.g., disk extents) is referred to as "dirty." The data written in flash blocks in first tier storage 304 is associated with one or more disk extents (e.g., multiple flash blocks are written to a region of flash storage that is demarcated for each disk extent). The one or more disk extents waits to be written back to disk storage (e.g., for certain criteria to be met). Once the one or more disk extents is written to disk storage, the data is marked as "clean" in the metadata tree. As used herein, data that is stored on both first tier storage 304 and second tier storage 308 is referred to as "clean." "Clean" data stored (e.g., as flash blocks) in first tier storage 304 is marked as "reclaimable" when they are not desired to be retained in first tier storage 304 as cached data. The operation of marking data in flash storage as reclaimable is based at least in part on their access count (e.g., the frequency of read and/or write of the data). For example, after flash blocks have been marked as "reclaimable," they remain in flash (e.g., and used as cached data) until the garbage collection reclaims their space in flash storage.

Figure 4:
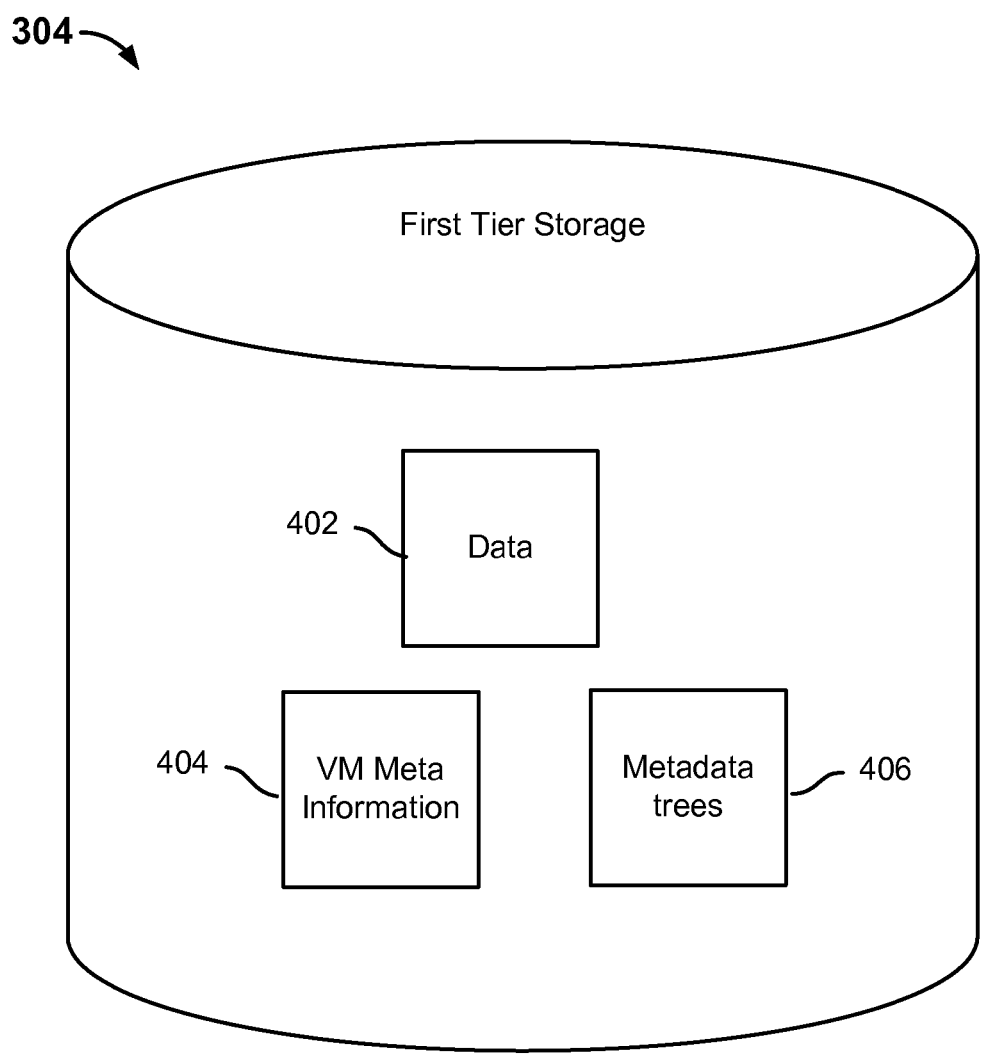
FIG. 4 is a diagram showing an embodiment of a first tier storage.

FIG. 4 is a diagram showing an embodiment of a first tier storage. In some embodiments, first tier storage 304 is implemented with the example of FIG. 4. As shown in the example, first tier storage 304 includes data 402, VM meta information 404, and metadata trees 406. In some embodiments, first tier storage 304 is flash storage.

VM meta information 404 identifies which stored data objects (e.g., such as data of data 402), such as files or other VM storage abstractions, are associated with which VM or vdisk. In some embodiments, VM meta information 404 also stores attributes and policies associated with each VM and/or vdisk. In some embodiments, a group of one or more VMs, vdisks, or files that is associated with the same set of policies is referred to as an "eviction group" or a "write back group" (e.g., each group is treated similarly from a policy perspective). In some embodiments, VM meta information 404 includes eviction and/or write back group information (e.g., which files are part of the same group and which policies are associated with that group). In some embodiments, VM meta information 404 also includes an access count for each block of data that is associated with a file or a VM. For example, a separate array and/or Bloom filters can be used to track access counts for each block of data that is associated with a file or a VM. In some embodiments, the access count is incremented every time the data is accessed (e.g., the data is requested by a write or read operation).

Data 402 is data that is stored at first tier storage 304. In some embodiments, data 402 is stored as blocks of flash that are enclosed by one or more disk extents. In some embodiments, a disk extent is demarcated in first tier storage 304 as a region or enclosure containing multiple flash blocks to which data may be written. In some embodiments, data 402 contains files, data objects or other VM storage abstractions. In some embodiments, data 402 includes both "dirty" and "clean" data.

Metadata trees 406 include tree data structures (e.g., B-trees) that map to locations in first tier storage 304 where data 402 are stored. For example, a tree data structure contains an offset to the location for the data for that offset. In some embodiments, metadata trees 406 include other information regarding data 402, such as access (e.g., frequency) counts, whether the data is "clean" or "dirty", whether the data has been de-duplicated (e.g., the data that is shared by more than one file). In some embodiments, the tree data structures also map to locations in a second tier storage where data (e.g., that has been written back from first tier storage 304) are stored. In some embodiments, metadata trees 406 include at least one tree data structure for each file whose data is maintained at least in part by first tier storage 304. In various embodiments, one tree data structure maps to the storage locations of data for a file and another tree data structure records all data that must be preserved for the file at the next snapshot. In some embodiments, a tree data structure includes an access count for each block of data for which it maps to one or more storage locations. In some embodiments, the access count is incremented every time the data is accessed (e.g., whether the data is requested by a write or read operation).

Figure 5:
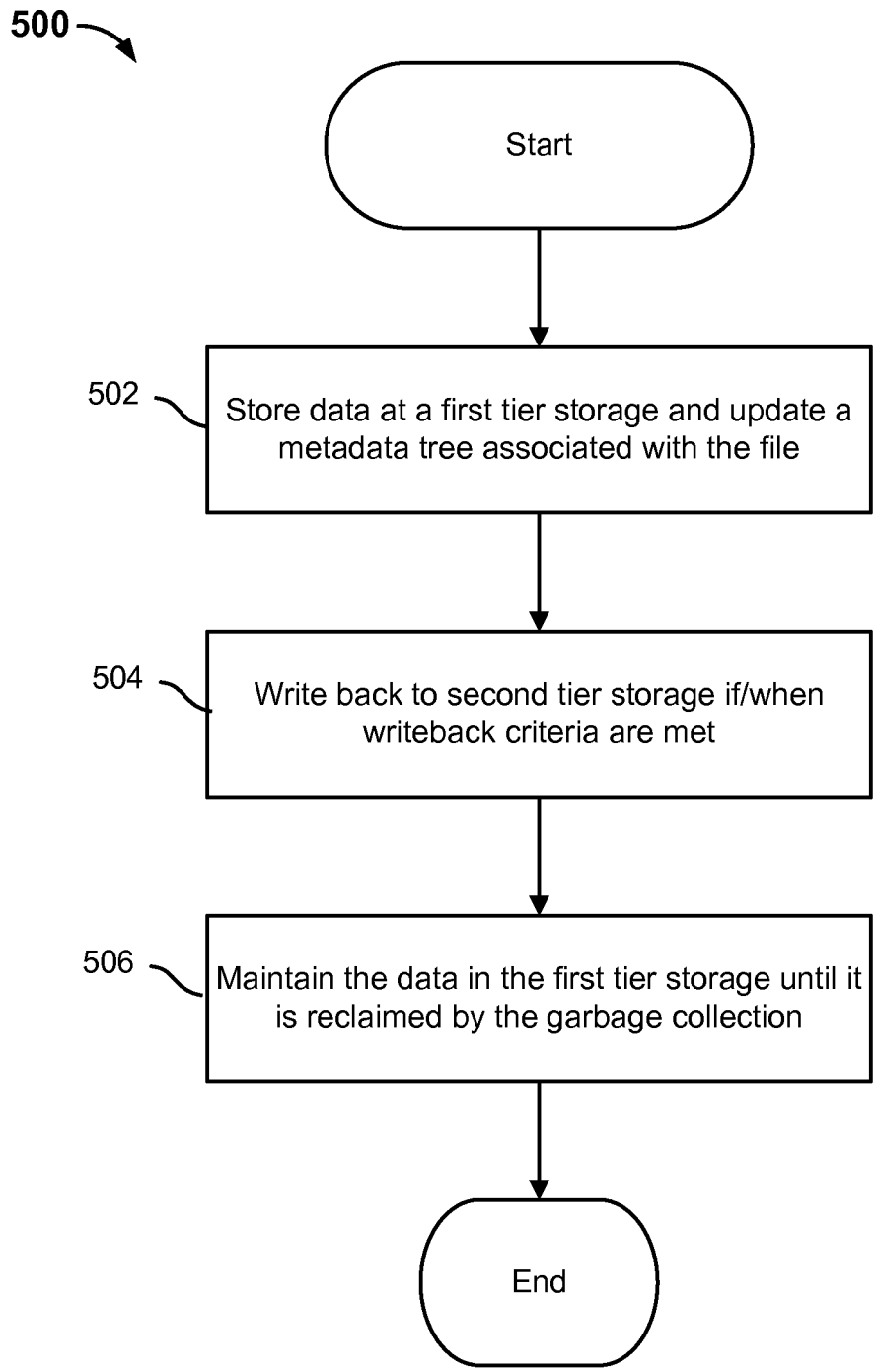
FIG. 5 is a flow diagram showing an embodiment of a process for maintaining data in a hybrid file system.

FIG. 5 is a flow diagram showing an embodiment of a process for maintaining data in a hybrid file system. In some embodiments, process 500 may be implemented using storage 210.

At 502, a request to write data is received. In some embodiments, the request to write data includes information identifying to which file (e.g., associated with which VM whose data is managed by storage 210) the data is to be written.

In some embodiments, the data is de-duplicated, if needed. In some embodiments, the de-duplication is implemented by using a fingerprint to identify identical blocks that are already in the first tier storage (e.g., flash storage). Identical blocks may already exist in the first tier storage because, for example, the same data of the write request has already been stored for another file that is associated with storage 210.

In various embodiments, the data is written to the first tier storage using a log-structured approach, which is optimized for the storage type of the first tier storage (e.g., flash). The log-structured approach permits data to be written to first tier storage in large, sequential units. Furthermore, the log-structure writes data into new locations so that write failures do not corrupt existing data.

The data is written to a first tier storage and a metadata tree associated with the file is updated. In some embodiments, the data is compressed before being written to the first tier storage. The data is broken up into blocks of the first size that is optimized for the first tier storage and written to/stored at the first tier storage. In some embodiments, the blocks of data are written within a region or enclosure of one or more disk extents. At least one metadata tree associated with the file is updated to include the mapping to the location in first tier storage of this newly written data. Also, the metadata tree is updated to indicate that this newly written data is "dirty," since presumably, it will not be immediately written back to a second tier storage after being added to first tier storage.

At 504, data on the first tier storage is written back to second tier storage if/when write back criteria are met. In some embodiments, data is stored (e.g., within disk extent enclosures) on the first tier storage until certain criteria are met. Examples of criteria include when the access counts of the blocks within one disk extent becomes relatively low as compared with the access counts of other disk extents and/or when a certain quota has been reached by data associated with a particular file or set of files. In various embodiments, data is written back to the second tier storage in an approach that is optimized for the storage type of the second tier storage (e.g., disk). In some embodiments, data is written back to the second tier storage on the unit of a disk extent. In some embodiments, if write back criteria are not met for the data within a disk extent, then the data associated with the disk extent persists in first tier storage.

At 506, data is maintained on the first tier storage until it is reclaimed by the garbage collection. In some embodiments, data that has been written back to the second tier storage is indicated as "clean" in the metadata tree. "Clean" data may persist at the first tier storage and be used as read or write cache until it is marked as "reclaimable" (e.g., when certain conditions are met in a competitive process of allocating space in the first tier storage). In some embodiments, "dirty" data (e.g., data that has not been written back to the second tier storage) can also be marked "reclaimable" based on similar conditions as for "clean" data. An ongoing garbage collection process frees the space of the blocks of data that are marked as "reclaimable" in the first tier storage.

Figure 6:
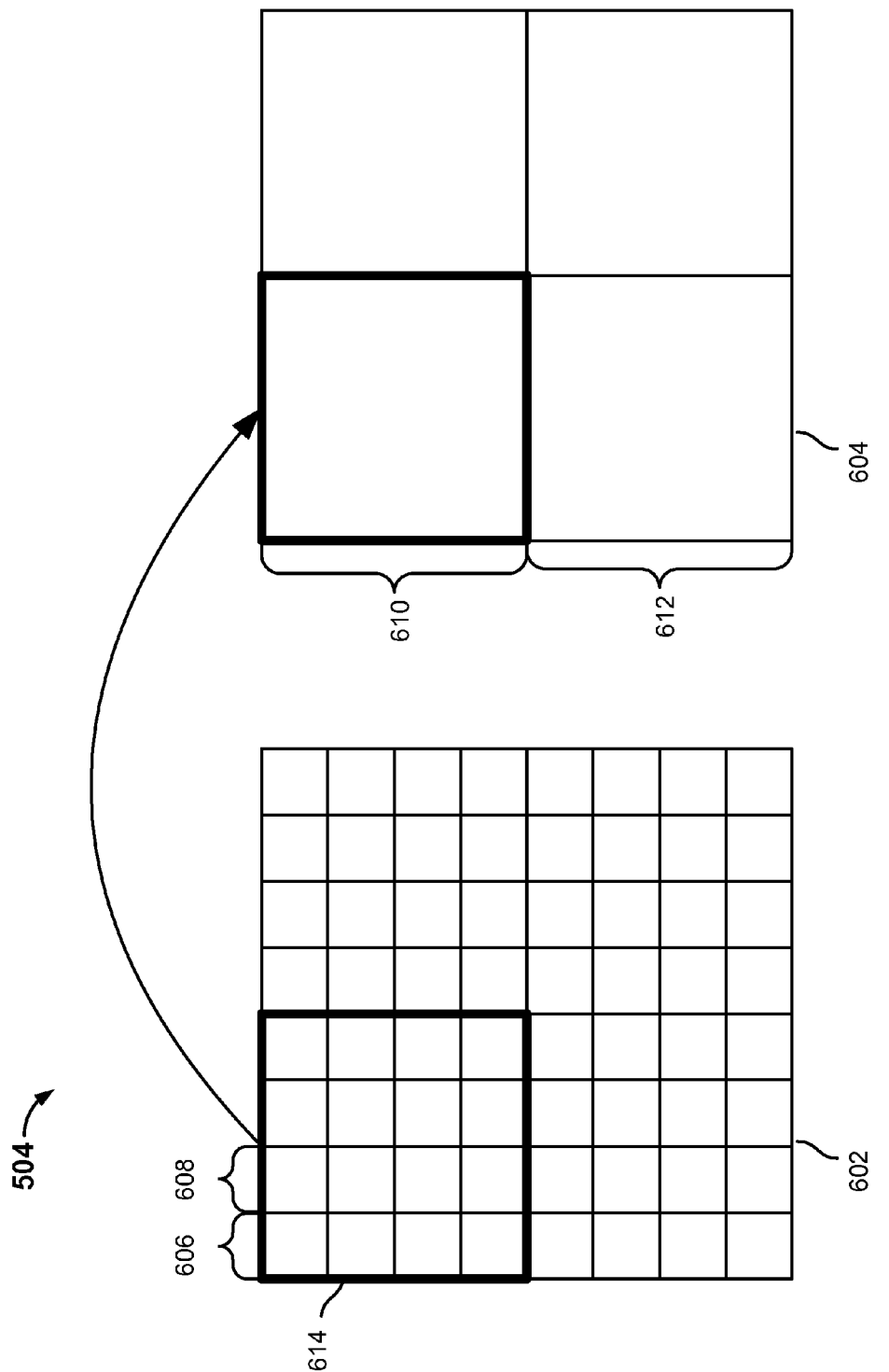
FIG. 6 is a diagram showing an embodiment of mapping blocks of storage from a first tier storage to blocks of storage at a second tier storage.

FIG. 6 is a diagram showing an embodiment of mapping blocks of storage from a first tier storage to blocks of storage at a second tier storage. In some embodiments, 504 may be implemented using the example of FIG. 6. As shown in the example, first tier storage 602 stores data in blocks (e.g., 606 and 608) of a first size and second tier storage 604 stores data in blocks (e.g., 610 and 612) of a second size. In various embodiments, a block of the second size (e.g., 610) is greater in size than a block of the first size (e.g., 606). In various embodiments, data (e.g., from write requests) is written to first tier storage 602 in contiguous blocks. In various embodiments, data written to contiguous blocks are enclosed within regions (e.g., one such region is outlined by dark border 614). In some embodiments, each of these enclosed regions is mapped to a block of data of the second size for second tier storage 604. In reference to 504, when write back criteria are met, data is written back from first tier storage 602 to second tier storage 604 in units of the blocks of the second size. So, during a write back operation, all the data (of the first block size that are) enclosed by border 614 are written back to second tier storage 604 as one block of data.

For example, first tier storage 602 is flash storage with flash blocks (e.g., 606 and 608) as units of storage. In this example, second tier storage 604 is disk storage with disk extents (e.g., 610 and 612) as units of storage. As write requests are processed by storage 210, data is broken down into flash blocks and written to contiguous flash blocks within a disk extent enclosure (as indicated by border 614) in the flash storage. Then, during a write back operation, the entire disk extent worth of data (enclosed by border 614) is written to the disk storage to conform to the size of a unit of storage at the disk storage.

Figure 7:
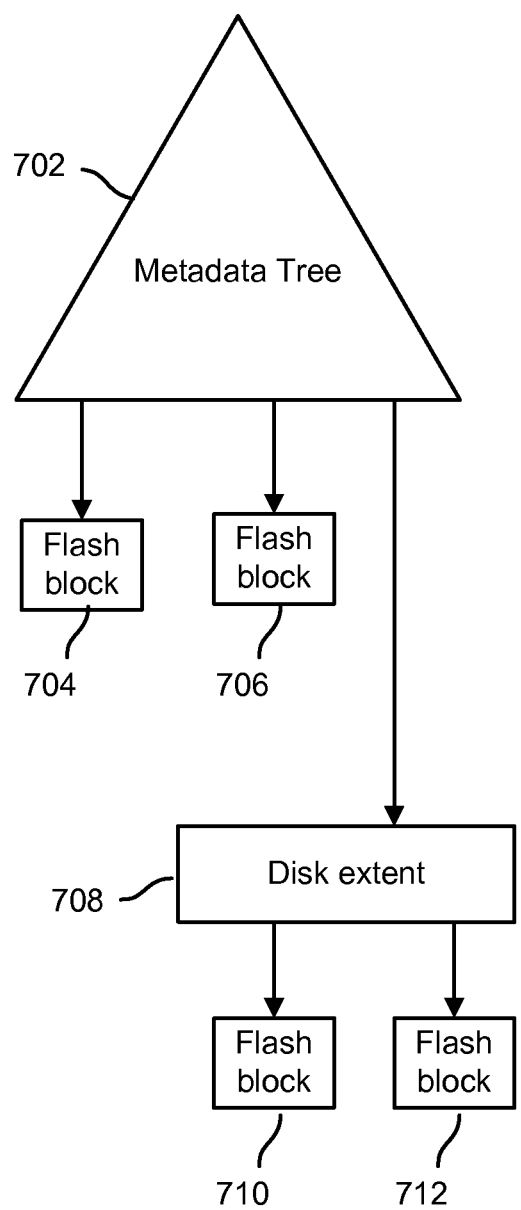
FIG. 7 is a diagram of an example of a metadata tree that maps to locations in storage.

FIG. 7 is a diagram of an example of a metadata tree that maps to locations in storage. In the example of FIG. 7, metadata tree 702 is stored in a first tier storage that is flash storage. Also, in the example of FIG. 7, an associated second tier storage (not shown) is disk storage. In some embodiments, metadata tree 702 includes metadata objects for each block of data stored by either or both of the flash and disk storages. In some embodiments, metadata tree 702 maps to data associated with a specific file (e.g., related to a VM). In some embodiments, metadata tree 702 is implemented using a B-tree data structure. In various embodiments, a read operation on the file associated with metadata tree 702 can query it to locate a desired block of data in either or both of flash and disk storage.

Metadata tree 702 maps to the locations (e.g., offsets) in flash storage and disk storage where data is stored. For example, a metadata object in a leaf of the tree can contain information for a block of data in either or both of flash and disk. In the example shown, metadata tree 702 maps to locations of data 704 and 706 in flash storage (e.g., by storing the offsets to those two locations in their respective metadata objects). In the example shown, metadata tree 702 also maps to data that has been written to disk extent 708 of the associated disk storage. Metadata tree 702 can indicate whether data stored at a particular location is "dirty" (e.g., only stored on first tier flash storage) or "clean" (e.g., the data is associated with a disk extent that has been written back to second tier disk storage). For example, metadata tree 702 can maintain "block" metadata objects for "dirty" data and "extent" metadata objects for "clean" data. In some embodiments, for a block of data that is "clean" but not yet reclaimed/garbage collected in flash storage (e.g., such as flash blocks 710 and 712), metadata tree 702 can indicate that while a block of data exists in disk storage, a copy of it still remains in flash storage. For example, if a copy of written back data still remains in flash, it may be indicated by concatenating a "1" to the offset for the particular data or concatenating a "0" to the offset otherwise.

Figure 8:
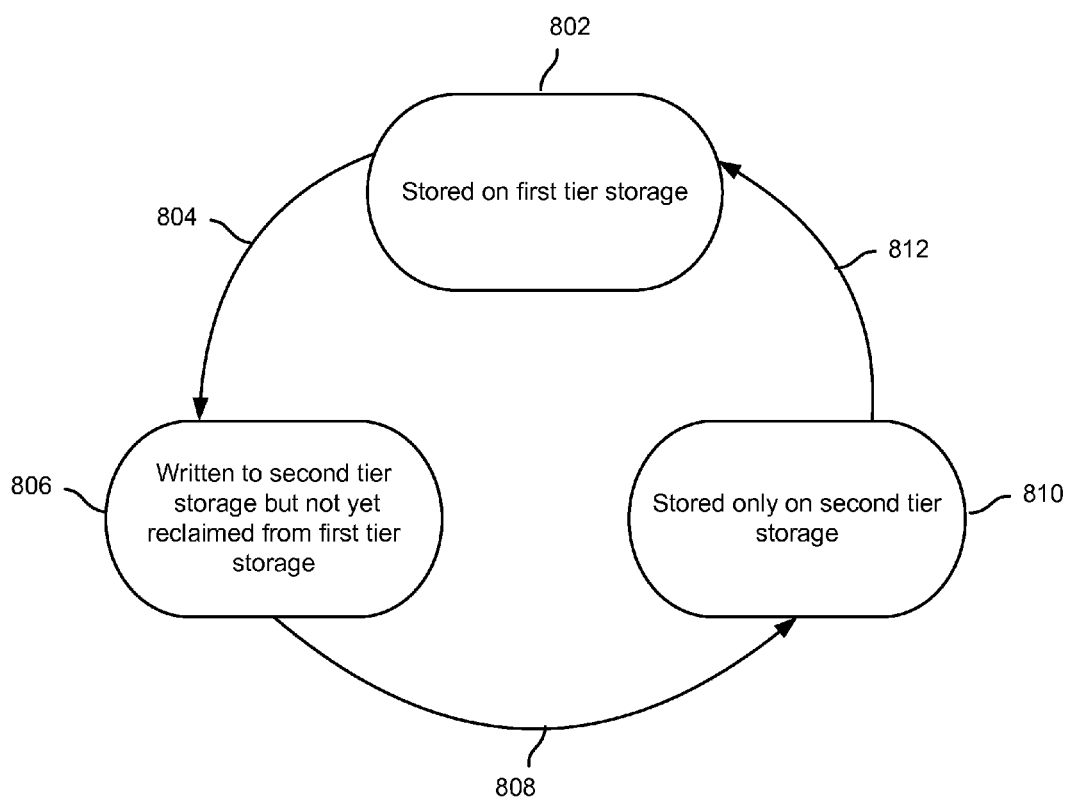
FIG. 8 is a state diagram showing an example of the states of data that are stored in the hybrid file system.

FIG. 8 is a state diagram showing an example of the states of data that is stored in the hybrid file system. In some embodiments, storage of data at storage 210 of a hybrid file system can be represented by states 802, 806 and 810. As mentioned above, storage 210 includes a first tier storage and a second tier storage.

In some embodiments, stored on first tier storage state 802 takes place after a request to write data is processed. In some embodiments, the file system breaks the data of the request down into blocks of the size of the first tier system (e.g., flash blocks for a first tier flash storage) and stores them at the first tier storage. In some embodiments, the data is written into an enclosure of the first tier storage for a disk extent. The disk extent is queued to be written to the second tier storage (e.g., disk storage).

In some embodiments, transition 804 takes place when criteria for a write back operation are met. When the criteria are met for a disk extent, the data associated with the disk extent is written back to second tier storage.

In some embodiments, written to the second tier storage but not yet reclaimed from first tier storage state 806 takes place after transition 804. After data that is associated with a disk extent is written back to the second tier storage from the first tier storage, the data is retained in the first tier storage until it is reclaimed by the garbage collection process. In some embodiments, this data retained in the first tier storage is not reclaimed (e.g., during reclamation, the space that data occupies in the first tier storage is freed for new data) until after it is marked as "reclaimable." In some embodiments, this data is marked as "reclaimable" when one or more of the following occurs: the data block is overwritten by new data, the access count of the data falls below a certain threshold, the file associated with the data is deleted or truncated, among others. In some embodiments, this data is used as read and/or write cache until it is reclaimed.

Transition 808 takes places when a garbage collection operation frees up the data blocks that are marked as "reclaimable" in the first tier storage. In some embodiments, the garbage collection operation is an ongoing process that detects and frees up space that is marked as "reclaimable."

In some embodiments, stored only on second tier storage state 810 applies to the data that was written back to the second tier storage and whose copy at the first tier storage has been reclaimed.

Transition 812 takes place when a read operation requests to read data that is stored only at the second tier storage. In some embodiments, the read request queries a metadata tree associated with the requested data to locate the data. When the desired read data is located in the second tier storage, only the portions of a block of storage that are relevant to the request are written to corresponding locations in first tier storage. In some embodiments, the read data is broken into blocks of the size for the first tier storage and stored back on the first tier storage. In some embodiments, the read data is not stored back on the first tier storage. In some embodiments, additional data is prefetched from the second tier of storage and stored on the first tier storage, based on a per-VM or global prefetch policy. For example, more data than was requested could be read and the portion of the read data that is moved to the first tier flash storage could depend on a per-VM or global prefetch policy.

Figure 9:
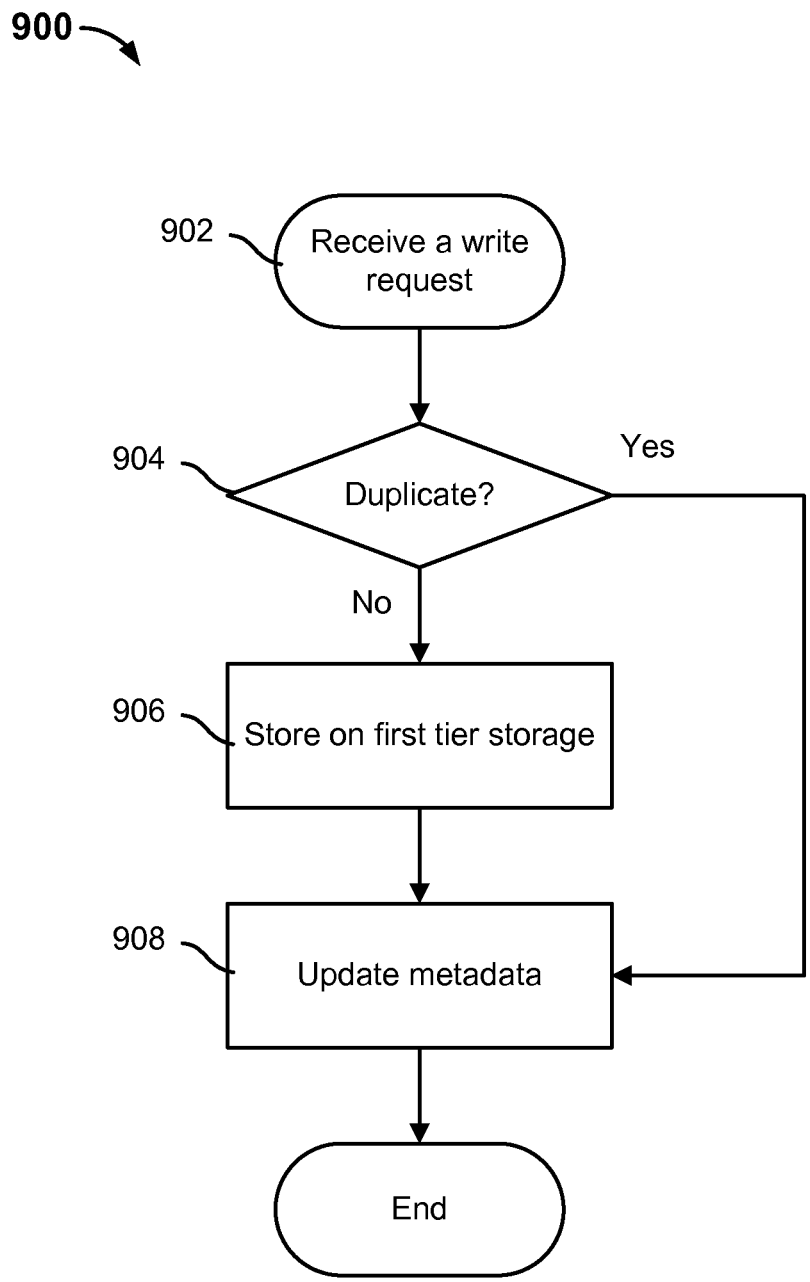
FIG. 9 is a flow diagram showing an example of writing data to the first tier storage of the hybrid file system.

FIG. 9 is a flow diagram showing an example of writing data to the first tier storage of the hybrid file system. In some embodiments, process 900 is an example of how an operation to write data is processed by storage 210. In some embodiments, 502 of process 500 may be implemented with the example of FIG. 9.

At 902, a request to write data is received. In some embodiments, the request to write data includes information identifying to which file (e.g., associated with which VM for which storage 210 manages data) the data is to be written.

At 904, it is determined whether a duplicate of the data already exists in storage 210. In some embodiments, determining whether a duplicate of the data already exists in storage (e.g., de-duplication) is implemented by using a fingerprint to identify identical blocks that are already in the first tier storage (e.g., flash storage). If the data of the write operation is found as existing data that is already stored in the first tier storage, then no additional data is written and metadata associated with the data is updated in 908. For example, the access count of the existing data is incremented at an associated metadata tree and/or a set of information stored with the associated eviction group is incremented. However, if the data of the write operation is not found as existing data that is already stored in the first tier storage, then 906 is performed.

At 906, the data is stored on the first tier storage. In some embodiments, the first tier storage is flash storage. One example of storing data on the flash storage involves using a log-structured file system (which is referred to as "Flog" in this example) to permit sequential writes. One advantage of the log-structured file system is that it permits data to be written (e.g., to flash) in large, sequential units. This reduces or eliminates write amplification due to the internal metadata and garbage collection of the flash drives used in some embodiments. Another advantage of the log-structure file system is that for writes, it permits for data to be stored in new locations in flash, rather than writing over locations to which were previously written. This is so that write failures do not corrupt existing data. Some embodiments of implementing Flog are disclosed as follows:

Log-Structured Flash File System ("Flog")

Flog implements a log-structured object store with built-in RAID support over a collection of flash-based solid state drives (SSDs). This following describes the read/write path in some embodiments.

Flog includes built-in RAID support in some embodiments. Devices are grouped into RAID groups of 2 or more devices (3 or more for RAID-6). There can be more than one RAID group in the system. The layout of parity blocks for RAID is very different from traditional RAID layouts, and will be described below; we refer to this layout as RAID-T. The number of devices in a RAID group is referred to as the stripe width.

Flog is a user-space library that provides write and read services to the upper layers of realstore. Note that Flog is an object store, not a file system. Objects that can be written to and read from Flog are variable length (up to 8191 bytes in size), and have a fixed-length "id" which serves as a name for the object. Object ids are (mostly) opaque to Flog; the upper layers use them to identify the type of object and backpointer to related data structures. For example, a metadata page may be stored with a Flog id containing the stasis page id of the metadata page. A data page is stored with the Flog id containing the <filenumber,snapshot,offset> tuple or the stasis record id of a block metadata corresponding to the data page.

Objects in Flog are bundled into fixed size containers called segments. When a data object is first written to Flog, it is assigned space within a current free segment, but over time the object may be moved to different segments as the garbage collector works to compact objects into as few segments as possible to reduce fragmentation. All SSD storage is divided up into some number of segments based on the capacity of the drives, and each segment is assigned a unique segment number. Each segment belongs to a single RAID group; segments cannot span RAID groups. However, segments do span all the devices within a RAID group. The portion of a segment that is on a single device is called a seglet. The seglet size is typically chosen so that it is the minimum write size at which the random write performance the SSD approaches its maximum sequential write performance, without significantly impacting read latency. It follows from the above that segmentSize=segletSize*stripeWidth. Each segment (and seglet) contains some number of parity pages for RAID protection of that segment; we differentiate physical segment (seglet) size which includes the parity pages from logical segment (seglet) size, which excludes parity pages.

Each time a segment is written, it is assigned a unique monotonically incrementing 64-bit number called the checkpointId. The checkpointId is used to infer the write order of segments to flash.

In-Flash Structures

There are two main Flog data structures that live in flash: the superblock and Flog segments.

The superblock is a fixed size structure that is replicated on all the devices in the RAID group at LBA 0; this allows recovery of the superblock so long as at least one of the devices in the RAID group is still operational. In some embodiments, the superblock is only written to at format time, and contains various configuration parameters of the RAID group. In other embodiments, the superblock may be written every time we have a new log-structured checkpoint. After a reboot, the initialization code reads in the superblock from all devices in the RAID group, checks their CRCs, and verifies that their contents are consistent before using them. If fields that are supposed to be identical on all devices do not match, then the superblock with the highest checkpoint number (which is presumably the latest) will be used.

The other main in-flash structure is the segment. Because a segment spans multiple devices in a RAID group, it is not possible to represent it easily as a single C structure. As mentioned earlier, the portion of a segment that is resident on one device is called a seglet. Each seglet consists of a fixed number of 4 KB sized pages (the physicalSegletSize); this size depends on device properties (5 MB for Intel SSDs and 128 KB for Pliant SSDs). On any given device, the first seglet (belonging to segment number 0) starts at a fixed LBA offset (the SUPERBLOCK_MAX_SIZE, currently 256 KB), and the entire rest of the device can be thought of as an array of seglets.

If there are N devices in a RAID group, and P pages in a seglet, then the bottom P/N pages of each seglet are reserved for parity blocks. Data is filled into a segment from the top down, while parity blocks are filled from the bottom up. Thus, for RAID-5, the parity computed from page 0 on devices 0 ... N-2 would be put into the very last page in the seglet on device N-1. Parity for the next N-1 pages (i.e., page 0 of device N and page 1 of devices 0 ... N-3) would be in the last page of the seglet on device N-2, and so on. The top portion of each seglet which excludes the parity pages is called the "logical" seglet; it contains data and the segment summary.

Flog stripes data across seglets in a way that provides parallel access to sequentially written data. Each seglet is divided into fixed size "windows" (e.g., 16 KB each). When filling a segment, writes go into the seglet on device 0 until we cross the first window boundary; at that point, we switch to the seglet on device 1, and again write a window's worth of data. We continue doing this until the first window of all seglets is filled. We then wrap back to device 0 and continue writing to that seglet from where we left off, once again writing until the second window boundary is passed in that seglet is passed, and so forth. In some embodiments, striping scheme enables us to achieve optimal performance for sequential reads if we set the window size to be the minimum size at which the sequential read performance of the device matches its peak read bandwidth; sequential reads that are larger than the window size would then achieve maximum parallelism by virtue of their being striped over all the devices in the RAID group. For example, suppose we get a 64 KB read of uncompressible data. If there was no windowing, then all 64 KB may end up coming from the same seglet, so we would be limited to the read throughput of one device. With windowing, we would read 16 KB from each device. If the window size is too small, then we would not achieve optimal performance from any single device.

While data is being filled into the segment as described above, the Flog write logic also builds up a segment summary consisting of a segment summary header followed by the object descriptors for all the objects that have been written into the segment in time order.

Returning to process 900, at 908, the metadata is updated. In various embodiments, the metadata includes a metadata tree that is associated with the data. If data was stored on the first tier storage in 906, then the location (e.g., offset) for the stored data is included in the metadata tree. In some embodiments, this data is also marked as "dirty" in the metadata tree. Otherwise, if a duplicate of the data was found in the first tier storage in 904 and no additional data was stored, then the metadata corresponding to the identified existing data at the first tier storage is updated to increment in access count.

Figure 10:
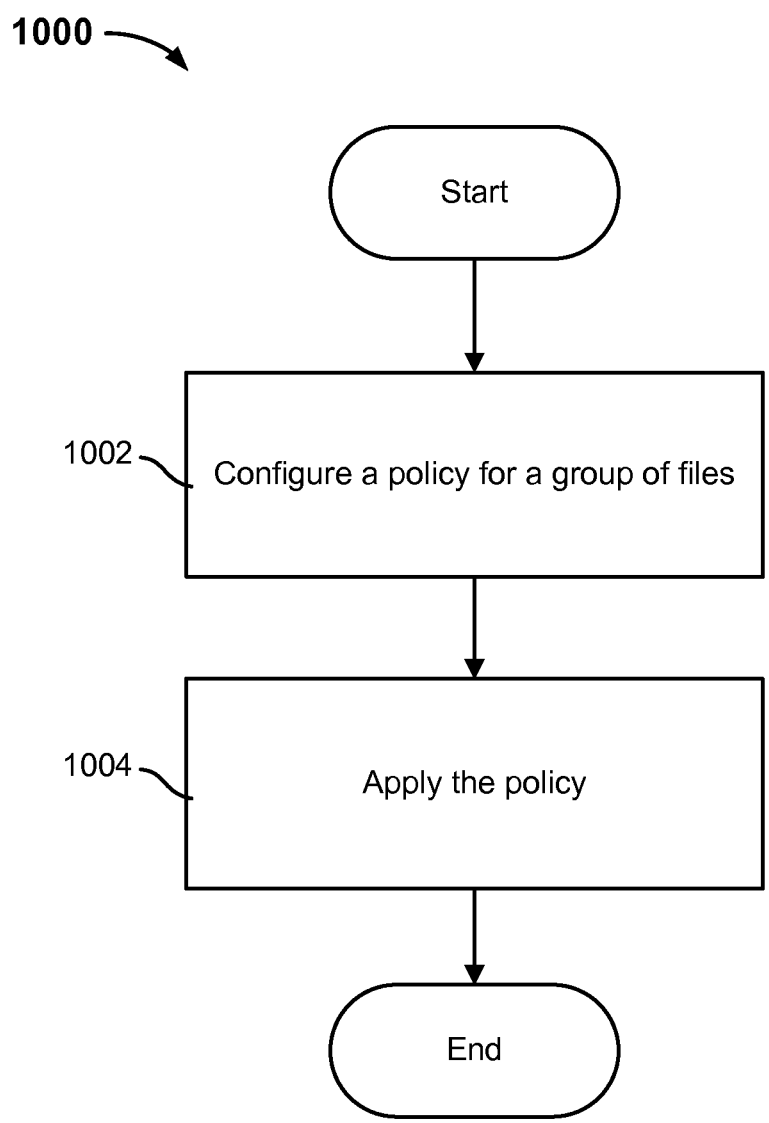
FIG. 10 is a flow diagram showing an embodiment of implementing a policy for a group of files.

FIG. 10 is a flow diagram showing an embodiment of implementing a policy for a group of files. In some embodiments, process 1000 may be implemented at storage 210. A group of files (e.g., of a particular VM or vdisk) may be selected to be treated similarly for the implementation of a particular policy at a first tier storage.

In some embodiments, an eviction group includes a set of files that are to be treated similarly for a garbage collection policy. In some embodiments, a write back group includes a set of files that are to be treated similarly for a write back policy. In some embodiments, each file that is managed by the storage includes references to the eviction group and the write back group to which it belongs. In some embodiments, an eviction group and a write back group include one or more of the same files in its set. In some embodiments, a single write back group exists for each eviction group. In some embodiments, multiple write back groups exist for a particular eviction group. In some embodiments, each eviction group and write back group has metadata (e.g., VM meta information 404) in the storage system (e.g., such metadata is stored at the first tier storage) that stores a number of quota, statistics and other information specific to the eviction group or write back group. In some embodiments, each eviction group and write back contains a list of all the files that belong to it. In some embodiments, an eviction module exists to enforce a configured policy for each eviction group. In some embodiments, a write back module exists to enforce a configured policy for each write back group. The modules may be implemented with a combination of software and/or hardware.

At 1002, a policy is configured for a group of files. In some embodiments, a policy pertaining to whether data should be placed into first tier storage at all (e.g., whether the data should be "pinned" in first tier storage) is configured. In some embodiments, a policy pertaining to whether data should be prefetched is configured. For example, more than the requested data can be read from the second tier storage and how much of the read data is placed at the first tier storage depends on the configured prefetch policy. In various embodiments, a garbage collection policy is configured. The garbage collection policy includes a quota in first tier storage (e.g., flash). In various embodiments, the quota in first tier storage quota is how much storage (e.g., blocks of storage or bytes of storage) to which files of the eviction group may write data before blocks of data associated with that eviction group need to be marked as "reclaimable." As mentioned above, blocks of data that are marked as "reclaimable" will eventually be freed up by a garbage collection process. In some embodiments, histograms are maintained to reflect the distribution of blocks across access counts.

In various embodiments, a write back policy is configured. In some embodiments, the write back policy includes a target and a hard limit on the amount of storage of "dirty" data (e.g., data that is stored only on the first tier storage but not the second tier storage) that is permitted for data of the write back group at the first tier storage. In some embodiments, a write back operation is performed whenever the amount of storage of dirty data exceeds the target amount. In some embodiments, a write back operation is performed whenever the amount of storage of dirty data exceeds the hard limit. In some embodiments, the target amount is a lower threshold of dirty data than the hard limit. In some embodiments, write back operations are performed whenever the second tier storage is idle. In some embodiments, exceeding the target or the hard limit of the amount of storage of "dirty" data or when the second tier storage is idle is a criterion for when a write back operation is performed.

In some embodiments, the eviction group or write back group contains one or more access-count-based statistics (e.g., read and/or write frequency counts) for the blocks of data associated with its files. In some embodiments, the eviction group or write back group refers to access counts maintained for each block of data in a metadata tree. These access-count-based are updated when operations (e.g., read and write) are performed at the storage system. For example, for each data in the first tier storage, an access count (e.g., a 7-bit data structure) stores the access count and an indication of whether the block is "reclaimable" (e.g., a 1-bit data structure) are maintained in an associated metadata tree. In some embodiments, histograms are maintained to reflect the distribution of blocks across access counts.

In some embodiments, the policies are set by a resource allocator (e.g., an administrator of the storage system).

At 1004, the policy is applied. In some embodiments, to enforce the garbage collection policy, the eviction module makes sure that the amount of storage (e.g., bytes) the eviction group has in the first tier storage does not exceed the quota in the policy. In some embodiments, the eviction group module marks blocks as "reclaimable" without removing references to the block. For example, a block can be marked or indicated as "reclaimable" by a value stored in an associated metadata tree. In some embodiments, the eviction module periodically checks whether a block should be marked as "reclaimable" (e.g., based on metadata) and marks the block as "reclaimable" when appropriate. In various embodiments, data blocks are marked as "reclaimable" as driven by various event (e.g., data is moved or the arrival or new events). In some embodiments, a data block is marked as "reclaimable" based upon at least whether its access count has fallen below a certain threshold (e.g., if the access count was above the threshold, then the data can be left in the first tier storage for caching purposes). In some embodiments, when a data block's access count has fallen below a certain threshold and an associated amount of dirty data is above a target or hard limit, then the data block is marked as "reclaimable." In some embodiments, when a data block's access count has fallen below a certain threshold and a new write operation has arrived which would cause the amount of dirty data to exceed the hard limit, then the data block is marked as "reclaimable." In that case, the data must be marked reclaimable before the write can succeed. In some embodiments, when the data block has been written back to the second tier storage, it is marked as "reclaimable." In some embodiments, a read miss has caused data to be moved from the second tier storage to the first (e.g., meaning that that moved data is clean) and so the data can be marked as "reclaimable." In some embodiments, a data block is marked as "reclaimable" after it is overwritten by new data or after the file with which it is associated becomes deleted or truncated. In some embodiments, marking blocks are "reclaimable" does not ensure that the blocks will be certainly reclaimed during a subsequent garbage collection process, but it does increase the likelihood that a garbage collection process will reclaim those blocks in the future.

In some embodiments, to enforce the write back policy, the write back module writes back "dirty" data for the files of its corresponding write back group to the second tier storage and updates their statuses as "clean" (e.g., in an associated metadata tree). In some embodiments, the write back module maintains a priority associated with each set of data (e.g., associated with a disk extent). The write back module writes back data based at least in part on these priorities (e.g., disk extents with higher priorities will be written back before those with lower priorities).

Figure 11:
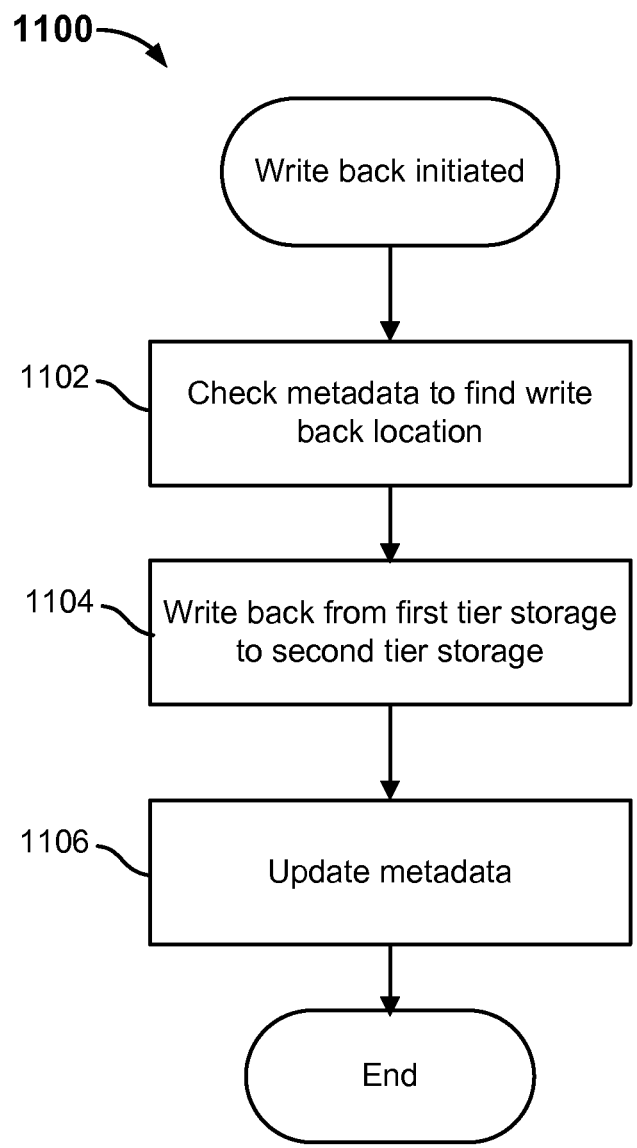
FIG. 11 is a diagram showing an example of writing back data.

FIG. 11 is a diagram showing an example of writing back data. In some embodiments, process 1100 is an example of how an operation to write back data is performed by storage 210. In some embodiments, write back process 1100 is initiated in response to the meeting of certain write back criteria as configured for a certain write back group (e.g., when a limit for the amount of dirty data at the first tier storage has been exceeded for a write back group). In some embodiments, write back process 1100 is initiated or scheduled periodically (e.g., at a period set by an administrator of the storage system). In this example, it is assumed that a disk extent is the unit on which data is written back from the first tier storage (e.g., flash storage) to the second tier storage (e.g., disk storage). In this example, it is also assumed at least one disk extent has been selected to be written back.

At 1102, metadata is checked to find a write back location. In some embodiments, at least one metadata tree is associated with the data in the selected disk extent. The metadata tree(s) stores mappings to locations in a second tier storage to which disk extents are written. In some embodiments, data at the first tier storage associated with a particular disk extent is always written back to a new location at the second tier storage. In some embodiments, if an older copy of the data previously existed at the second tier storage, then the old location will be freed up. In some embodiments, the new location may be chosen to minimize disk head movement or increase disk write throughput. In some embodiments, the new location may be chosen to produce greater locality for future disk accesses.

At 1104, the disk extent is written back from the first tier storage to the second tier storage. In some embodiments, a copy of the data associated with the selected disk extent at the first tier storage is written to the corresponding location (as found in 1102) in the second tier storage. A disk extent is written from the first to second tier storage in its entirety. In some embodiments, a disk extent contains both "clean" and "dirty" data, which are both written back (although, the amount of "dirty" data in a disk extent is one of the bases for which a disk extent is selected for write back). In some embodiments, after 1104 is performed, the data resides on both the first tier storage and the second tier storage for some time before the space for the data in the first tier storage is reclaimed by garbage collection.

At 1106, metadata is updated. In some embodiments, the metadata tree that stores mappings to locations in the first tier storage and the second tier storage is updated to reflect the fact that data has just been written back to the second tier storage. For example, in the metadata tree, a metadata object stores information for a block of data that is mapped to a location in the first tier storage. After the block of data is written back to the second tier storage, the corresponding metadata object is updated to denote that the data can now be found in second tier storage. If the block of data has not yet been reclaimed in the first tier storage, then the corresponding metadata object can also include an indication that the block of data can be accessed in the first tier storage (e.g., by storing a reference to the location in first tier storage).

Figure 12:
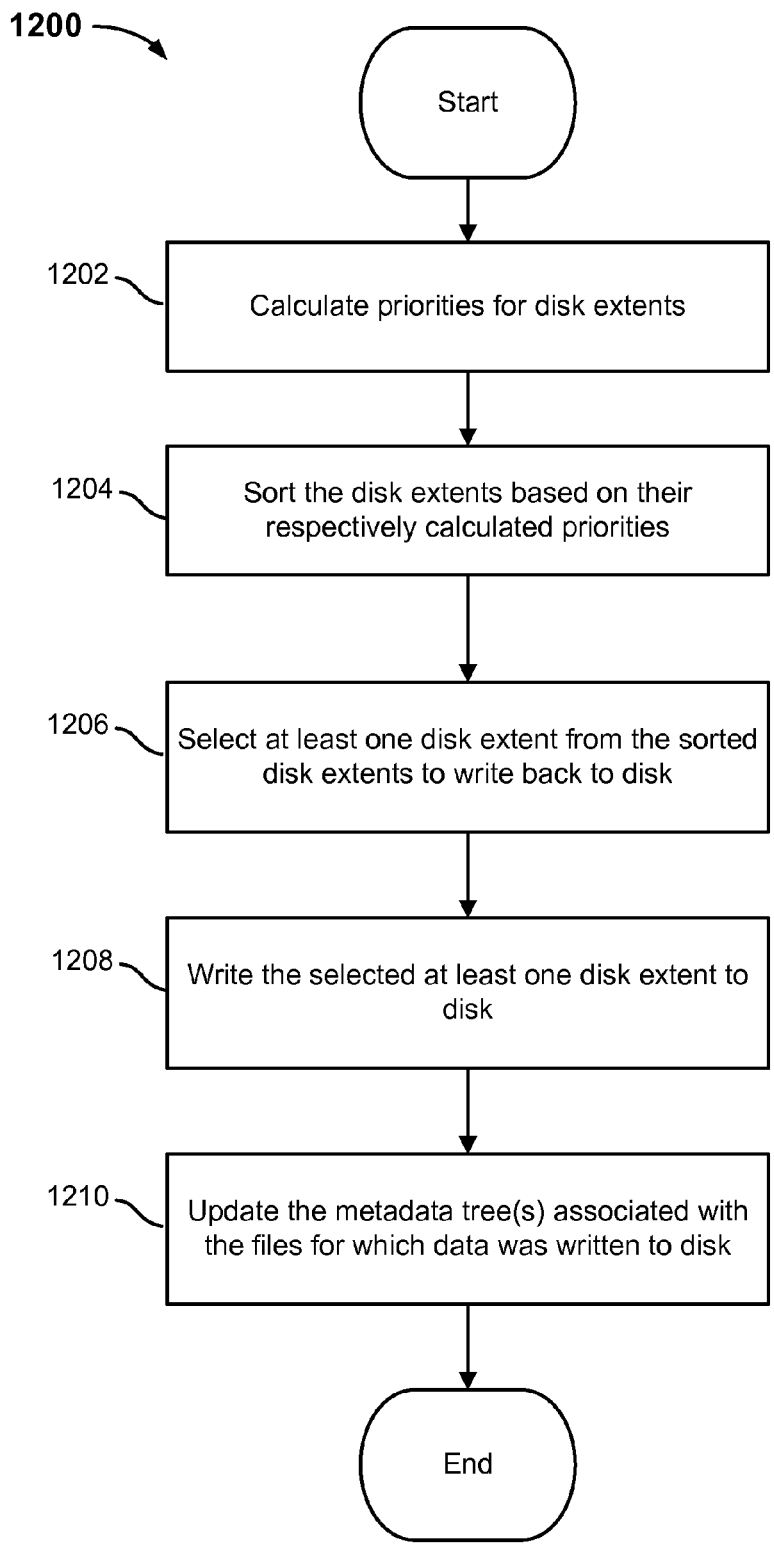
FIG. 12 is a flow diagram of an example of a write back operation in a hybrid file system.

FIG. 12 is a flow diagram of an example of a write back operation in a hybrid file system. In some embodiments, process 1100 may be implemented with the example of process 1200. In this example, the first tier storage is a flash storage and the second tier storage is a disk storage. At the flash storage, data is stored in flash blocks to disk extents and the data associated with the disk extents are written back to the disk storage during write back operations. In some embodiments, process 1200 is initiated when certain criteria for a write back operation are met or upon the next periodic iteration of a write back operation.

At 1202, priorities for disk extents are calculated. At the flash storage, one or more disk extents each store a (e.g., 16-bit) value that is used to compute priority. In some embodiments, the value contains bits representing one or more of the following fields: the number of dirty flash blocks within the extent, age (e.g., the time since the last write back on the extent), and a summary of the access counts from the related eviction group. The priority of each disk extent is then calculated from those fields. The calculated priority is higher for disk extents with a higher number of dirty blocks, older age, and fewer access counts.

At 1204, the disk extents are sorted based on their respectively calculated priorities. In some embodiments, in order to increase the ease of selecting disk extents with higher priorities, the disk extents are sorted by their priorities.

At 1206, at least one disk extent from the sorted disk extents is selected to write back to disk storage. The disk extent with the highest priority or the disk extents with relatively higher priorities are pulled from the sorted list. In some embodiments, when multiple disk extents are selected, all the selected disk extents have the same priority.

At 1208, the selected at least one disk extent is written back to disk. The data associated with the selected disk extents are copied from the flash storage to the disk storage. This data that has been written back is retained in the flash storage until it is reclaimed by garbage collection.

At 1210, the metadata tree(s) associated with the files for which data was written to disk storage is updated. After data has been written back to disk storage, their associated metadata trees are updated to indicate that such data is now "clean".

Figure 13:
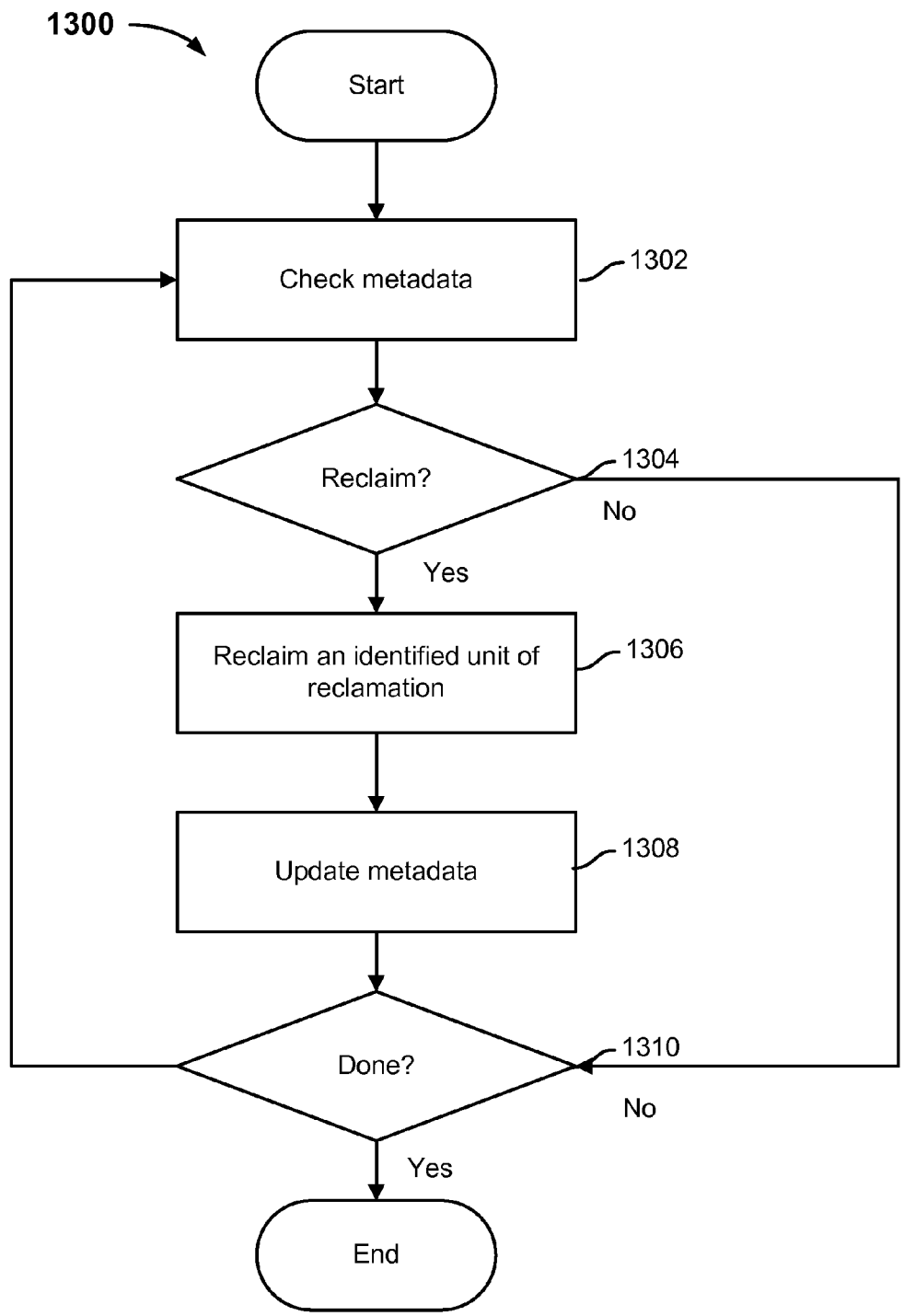
FIG. 13 is a flow diagram showing an embodiment of garbage collection.

FIG. 13 is a flow diagram showing an embodiment of garbage collection. In various embodiments, process 1300 is the garbage collection process for freeing up space in the first tier storage of storage 210. In some embodiments, garbage collection is an ongoing process (e.g., garbage collection occurs periodically or continuously so long as the storage system is turned on). For the example of FIG. 13, storage space is reclaimed per "unit of reclamation." Each unit of reclamation is a predetermined, lowest amount of storage that can be reclaimed in each iteration of the garbage collection process. In some embodiments, each iteration of garbage collection reclaims one or more units of reclamation. In some embodiments, each unit of reclamation includes multiple blocks of data of the first size for the first tier storage. In some embodiments, the storage space size for the unit of reclamation is set by an administrator of the storage system.

At 1302, metadata is checked. In some embodiments, the garbage collection identifies, based on the metadata (e.g., metadata tree or data table), which unit of reclamation to reclaim based at least on how much data in the unit is marked as "reclaimable." As mentioned above, a block of data in the first tier storage may be marked as reclaimable based on one or more of the following: whether its access count falls below a certain threshold, whether it has been written back to the second tier storage, whether it has been overwritten by new data and when an associated file becomes deleted or truncated. In some embodiments, metadata trees are scanned periodically to determine whether one or more blocks can be marked as "reclaimable." In some embodiments, a data block within a unit of reclamation may be marked as "reclaimable" by an eviction group module that is associated with the data stored at that block. The more "reclaimable" blocks there are in the unit, the more likely the unit will be chosen for garbage collection.

For example, when the first tier storage is a flash storage in a log-structured file system (Flog), then each unit of reclamation is one segment or a set of segments (e.g., a container). In this example, a table (e.g., a vector data structure) can be maintained (e.g., by the storage system) that stores information for all the units of storage space for reclamation (e.g., segments) at the first tier storage. The table can include the following: the status of the segment (e.g., whether it is currently being written to, in-use, currently being cleaned . . . etc), the number of areas that are marked as "reclaimable" within the segment, and the most recent modification time of the segment. The garbage collection can check the table to select one or more segments (e.g., the segments have relatively more "reclaimable" space) to process.

At 1304, it is determined whether a unit of reclamation is to be reclaimed. In some embodiments, it determined whether a unit of reclamation is available for garbage collection. In some embodiments, more than one unit may be identified for reclamation. In some embodiments, units of reclamations are identified when they have comparatively more "reclaimable" areas than other units. In some embodiments, for a unit of reclamation containing data that is shared by more than more file (e.g., duplicate data), the unit may not be reclaimed until it is no longer referenced by any of the files that once shared the data. In various embodiments, this determination is based on checking the metadata.

Returning to the example, the garbage collection can check the table to determine whether any of the segments have any "reclaimable" blocks. If more than one segment with "reclaimable" areas are identified, then the one or ones with the highest amount of reclaimable space are identified for reclamation. Otherwise, if no segments include any "reclaimable" blocks, then the metadata is checked again (e.g., at a later time).

At 1306, an identified unit of reclamation is reclaimed. In some embodiments, reclamation involves freeing up the storage space for new data and removing references to the space.

Returning to the example, the garbage collection processes multiple identified segments in one iteration. Sometimes, the garbage collection processes segments with "reclaimable" areas to produce entire, free segments on which new data can be written. So, the garbage collection sometimes processes as many segments with "reclaimable" areas as are necessary to produce one free segment.

At 1308, metadata is updated. In various embodiments, metadata includes references to the data. In some embodiments, at least one metadata tree is associated with the data of the reclaimed units. An associated metadata tree maps to the location (e.g., offset) of the data in the first tier storage (and sometimes to the location of the same data in second tier storage), prior to reclamation. After the data at the location is reclaimed, in some embodiments, the mapping to that data in the first tier storage is removed. In some embodiments, the metadata tree for the data still includes mapping to its location in a second tier storage (if there is such a copy of the data at the second tier storage).

At 1310, it is determined whether the process 1300 is done. In various embodiments, unless the storage system is shut down, process 1300 restarts at 1302.

Figure 14:
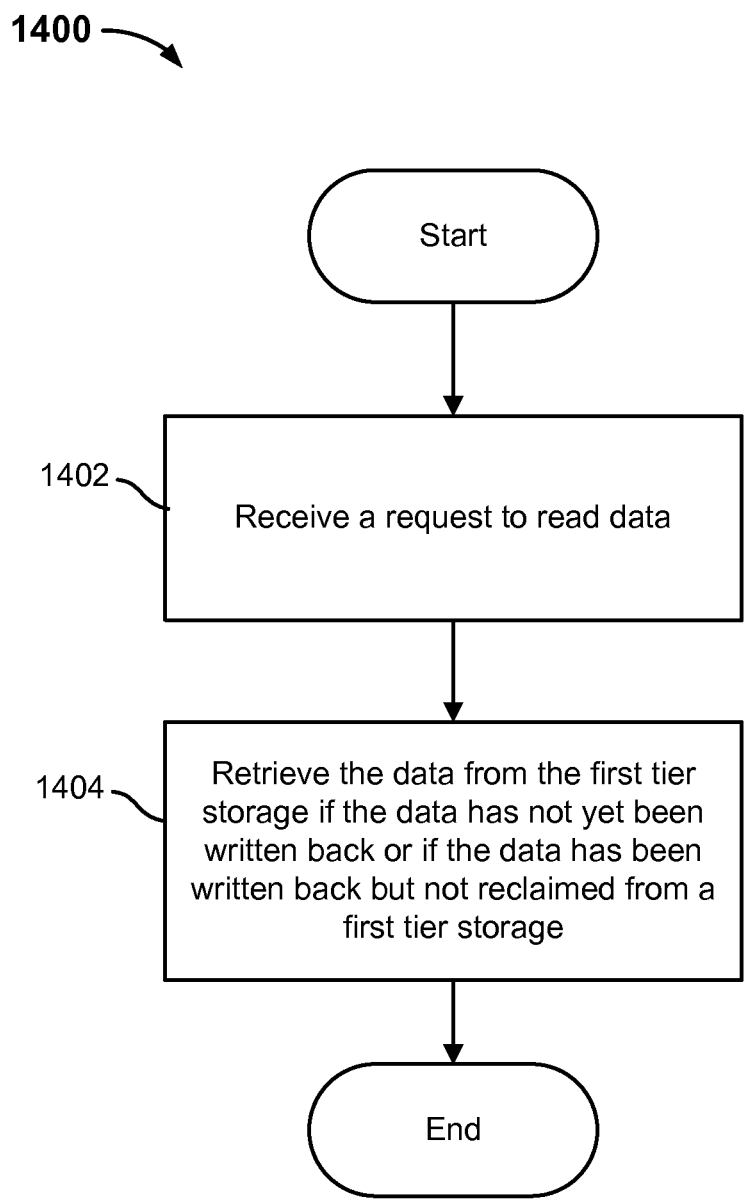
FIG. 14 is a flow diagram of an embodiment of reading data that has not yet been reclaimed from a first tier storage.

FIG. 14 is a flow diagram of an embodiment of reading data that has not yet been reclaimed from a first tier storage. In some embodiments, process 1400 is performed using storage 210.

At 1402, a request to read data.

At 1404, the requested data is retrieved from the first tier storage if it has not yet been written back or if it has been written back but not reclaimed. In some embodiments, data that has been written to the first tier storage is selected to be written back to a second tier storage. In some embodiments, this ("clean") data that has been written back still remains on the first tier storage until it is marked as "reclaimable" and is ultimately reclaimed by the garbage collection. Until the written back data is garbage collected, it may be read at the first tier storage (which in effect, turns the first tier storage as a cache for such data). In some embodiments, one advantage to using first tier storage as cache for such data (as opposed to reading the data from the second tier storage) is that the first tier storage has comparatively higher I/O over the second tier storage.

Figure 15:
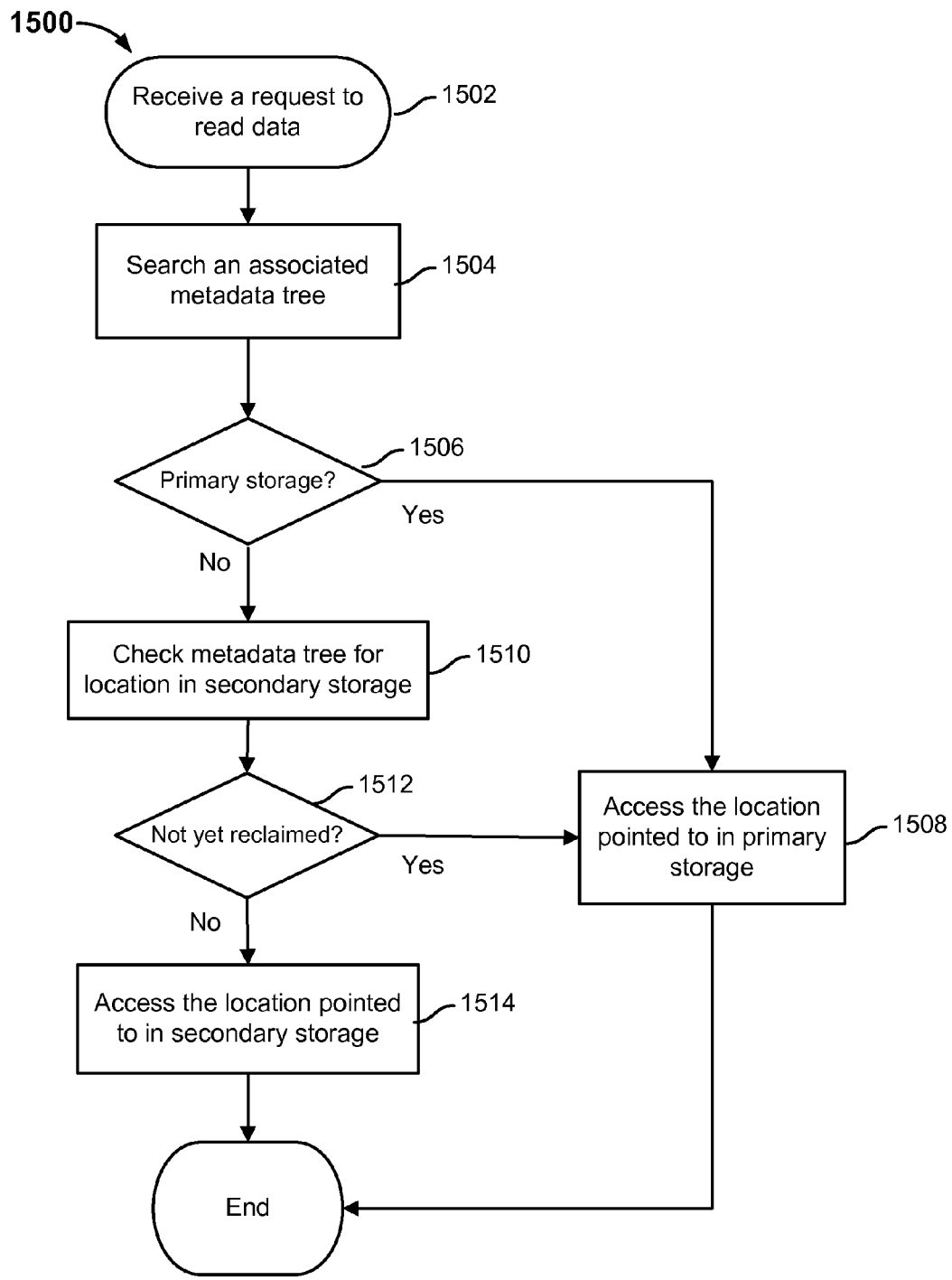
FIG. 15 is a flow diagram of an embodiment of reading data from the hybrid file system.

FIG. 15 is a flow diagram of an embodiment of reading data from the hybrid file system. In some embodiments, process 1500 may be implemented in storage 210.

At 1502, a request to read data is received. In some embodiments, the read operation is received by the file system. In some embodiments, the read request includes information identifying a specific file that is managed by the storage system. In some embodiments, a metadata tree for the specific file can be identified and checked for the requested data in 1504.

At 1506, it is determined whether a matching entry for the requested data can be found in a metadata tree. In some embodiments, it is determined whether a matching first tier (e.g., primary) storage metadata object (e.g., block metadata object) in the metadata tree can be found for the requested data. If a matching first tier storage metadata object is found, then the requested data is accessed at the location in first tier storage that is referenced by the object at 1508 and the process ends. Otherwise, if matching first tier storage metadata object is not found, then 1510 is performed.

At 1510, the metadata tree is checked for a location of the requested data in the second tier (e.g., secondary) storage. In some embodiments, the metadata tree is checked for a matching second tier storage metadata object (e.g., extent metadata object) for the requested data. When a matching second tier storage metadata object is found, the metadata object is checked for an indication that the data has not yet been reclaimed from the first tier storage in 1512. If the metadata object indicates that the data has not yet been reclaimed, then the data is accessed at the location in the first tier storage that is referenced by the object at 1508 and the process ends. But if the metadata object indicates that the data has already been reclaimed, then the data is accessed at the location in the second tier storage as referenced by the object at 1514.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A data storage system, comprising:
   a first storage device of a first storage device type;
   a second storage device of a second storage device type; and
   a processor configured to implement a hybrid file system configured to store each of a plurality of data values in at least a corresponding primary location, which for a given data value may be in at least one of the first storage device or the second storage device;
   wherein the hybrid file system is configured to use a first access approach optimized based on a first access attribute of the first storage device type to interact with the first storage device and a second access approach optimized based on a second access attribute of the second storage device type to interact with the second storage device, wherein data comprising a set of one or more blocks of a first size associated with the first storage device is configured to be written back to the second storage device, wherein the set of one or more blocks of the first size associated with the first storage device to be written back corresponds to a second size of a block associated with the second storage device.

2. The data storage system of claim 1, wherein the first access approach comprises a log-structured approach.

3. The data storage system of claim 1, wherein the first access approach comprises storing data in blocks of the first size optimized for the first storage device type and the second access approach comprises writing data back from the first storage device to the second storage device in blocks of the second size optimized for the second storage device type.

4. The data storage system of claim 3, wherein the processor is further configured to determine whether a condition for writing back is met.

5. The data storage system of claim 4, wherein the condition for writing back is based at least in part on falling below a threshold of access counts associated with data at the first storage device.

6. The data storage system of claim 4, wherein the condition for writing back is based at least in part on exceeding a quota of an amount of storage at the first storage device.

7. The data storage system of claim 1, wherein the at least a corresponding primary location in either the first storage device or the second storage device for a given data value is indicated in metadata.

8. The data storage system of claim 7, wherein the metadata includes a data structure that includes for each of a plurality of portions of a data object a corresponding storage location configured to store data indicating a location in which data comprising the portion is stored.

9. The data storage system of claim 7, wherein, subsequent to a write back operation, the metadata is updated to indicate for a data written back from a location in the first storage device a corresponding location to which the data has been written in the second storage device.

10. The data storage of claim 9, wherein the data structure includes a metadata storage location configured to store a location data indicating a location in the first storage device in which the written back data remains stored, notwithstanding the data having been written back to the second storage device.

11. The data storage of claim 9, wherein the data written back to the second storage device remains stored in the first storage device until a reclamation criterion is met.

12. The data storage of claim 11, wherein the processor is further configured to delete or otherwise update the location data upon reclamation of the location in the first storage device.

13. The data storage of claim 7, wherein the metadata includes access counts for data stored at the first storage device.

* * * * *